Patented Oct. 4, 1949

2,483,966

UNITED STATES PATENT OFFICE 2,483,966

NITROCELLULOSE SUBBING COMPOSITION FOR POLYVINYL RESIN FILM SUPPORTS

Russell P. Easton, Binghamton, N. Y., assignor to General Aniline & Film Corporation, New York, N. Y., a corporation of Delaware No Drawing. Application September 29, 1948, Serial No. 51,866

4 Claims. (Cl. 106—181)

1

This invention relates to photographic film and particularly to an improved nitrocellulose subbing composition for polyvinyl resin film supports.

It is known that polymerized vinyl compounds such as polymerized forms of vinyl chloride, vinyl bromide, vinyl acetate and copolymers of vinyl chloride and vinyl acetate have been proposed for the manufacture of photographic film supports because of their exceptional flexibility, strength and the like. Their moisture resistance is excellent and their dimensional changes with changes in humidity are negligible as compared with the film supports of cellulose derivatives and many other film forming resins. For these reasons, films of polyvinyl resins are finding application in the reproduction industries where glass plates are used and where an improved film support of better dimensional stability is desired.

The problem of obtaining proper adherence of a gelatino silver-halide emulsion to a polyvinyl resin film support has plagued the photographic film industry for many years. In the past, polyvinyl resin film supports have been subbed with a nitrocellulose varnish consisting of nitrocellulose, butyl alcohol, triphenyl phosphate, cyclohexanone and a mixture of acetone and methyl alcohol. After the varnish coating had dried, it was necessary to sub the nitrocellulose varnish layer with a gelatin subbing composition. The nitrocellulose varnish layer did not dry quickly and formed a blush in the drying process. When such layer was given a methanol wash carrying a dispersed amount of gelatin, adherence of the gelatino light-sensitive silver-halide emulsion was obtained but for a short period of time, and the emulsion flaked off whenever the polyvinyl resin was flexed. Various nitrocellulose and cellulose acetate varnishes together with various gelatin subbing compositions were tried but without success. In each case the emulsion layer flaked off whenever the film base was flexed.

The present invention has as an object to overcome the above-mentioned difficulties by providing an improved nitrocellulose subbing composition for polyvinyl resin film supports which precludes the flaking off of the gelatino light-sensitive silver-halide emulsion layer coating thereon when the film support is flexed and which does not desensitize and artificially age the gelatino silver-halide emulsion layer.

Another object is to provide a non-desensitizing, non-corrosive nitrocellulose subbing solution for gelatin in subbing polyvinyl resin film supports.

A further object is to provide a new type of nitrocellulose subbing solution in which the nitrocellulose is dissolved by a special solvent and plasticizer combination which has no adverse effect upon photographic gelatino silver-halide emulsion.

Other objects and advantages will appear from the following description.

The foregoing objects are accomplished by first coating the polyvinyl resin with a cellulose nitrate subbing solution consisting of a special mixture of solvents and a special plasticizer which will bind cellulose nitrate to the polyvinyl resin when coated by any of the methods known to the art without the aid of any intermediate resin layer followed by a gelatin subbing solution or dispersion.

The polyvinyl resin film bases which are subbed with the subbing solution of the present invention are polyvinyl chloride, polyvinyl bromide, polyvinyl acetate, copolymers of vinyl chloride and vinyl acetate, copolymers of vinyl bromide and vinyl acetate, copolymers of vinyl chloride and vinyl bromide, and mixtures of such polymers and copolymers. Films, foils, sheetings, and the like, prepared from these polyvinyl resins are commercially available in various thicknesses and the methods of their preparation need not be described herein.

The specific cellulose nitrate subbing solution, which I have found to be particularly adaptable for the polyvinyl resins and capable of holding the gelatino silver-halide emulsion layer, both when dry and when wet in the development process without flaking or dimensional change, respectively, is characterized by the following composition:

| | Parts by weight |
|---|---|
| Cellulose nitrate (11% nitrogen) | 5.0– 7.0 |
| Acetone | 40.0–50.0 |
| Methyl ethyl ketone | 9.0–10.0 |
| Methanol | 25.0–35.0 |
| Dioctyl phthalate | 2.5– 4.2 |
| Ethanol | 0.0– 3.5 |

When the above subbing solution is applied over the polyvinyl film support and dried, a solution or dispersion of gelatin is coated thereon. The gelatin subbed material is then dried at an appropriate temperature after which the usual gelatino silver-halide emulsion coating is deposited upon the gelatin surface.

All of the proportions of the constituents, with the exception of ethanol, in the foregoing composition are critical. If the proportion of each of the constituents employed is less than the minimum or greater than the maximum quantity, a subbing solution is obtained which is not satisfactory for subbing the polyvinyl resin. When such a solution is applied to the polyvinyl resin followed by a gelatin subbing solution and a gelatino silver-halide emulsion layer, the gelatino silver-halide layer will adhere to the gelatin surface, but just as soon as the film is flexed, there is a tendency for the original cellulose nitrate layer (deposited from the cellulose nitrate subbing solution) to crack. The energy of impact produced by the fracture is transmitted directly to the gelatin subbing layer and gelatino silver-halide emulsion layer and causes the latter layers to crack also. The combination of solvents utilized in dissolving the cellulose nitrate is unique in that it has the unusual property of softening or partially swelling the polyvinyl resin film support so as to cause the deposited cellulose nitrate to adhere to the film support.

The dioctyl phthalate plasticizer is absolutely essential in the solvent combination and cannot be replaced by any one of the commonly employed plasticizers utilized in plasticizing cellulose ester derivatives. It appears that dioctyl phthalate, of all the common plasticizers, has the unique property in the solvent combination of binding the cellulose nitrate of the subbing solution to the polyvinyl resin film support without the aid of any intermediate resin layer.

When a polyvinyl resin film is coated with the nitrocellulose subbing solution, in which the various constituents are within the proportions set forth, the nitrocellulose, the gelatin, and the gelatin silver-halide emulsion layers will not crack or break when the film is flexed.

Any gelatin solution or dispersion may be employed in coating the cellulose nitrate layer on the polyvinyl resin. As an example of a suitable solution or dispersion of gelatin, the following composition may be employed:

|  | Parts |
|---|---|
| Gelatin | 0.9 |
| Water | 2.2 |
| Salicylic acid | 0.2 |
| Methanol | 76.7 |
| Acetone | 20.0 |

When a film is to be prepared having a gelatin-non-curling backing layer or an anti-halation layer and a light-sensitive layer, the subbing solution of the present invention followed by a gelatin subbing composition may be applied to both sides of the polyvinyl resin film base.

The invention will be further illustrated but is not intended to be limited by the following examples:

*Example I*

A film base of polyvinyl chloride was coated with the following solution:

|  | Parts |
|---|---|
| Cellulose nitrate (11% nitrogen) | 5.0 |
| Acetone | 40.0 |
| Methyl ethyl ketone | 9.0 |
| Methanol | 25.0 |
| Dioctyl phthalate | 2.5 |

After the coating layer had dried, a gelatin dispersion of the following composition was coated thereon:

|  | Parts |
|---|---|
| Gelatin | 1.0 |
| Water | 5.0 |
| Acetic acid | 1.5 |
| Methanol | 74.5 |
| Acetone | 19.5 |

After the gelatin subbing layer had dried, the usual gelatino silver-halide emulsion was coated thereon. After drying and storage for several months, the emulsion adhered tenaciously to the polyvinyl chloride film support and did not crack when flexed.

*Example II*

A film base of a copolymer of vinyl chloride and vinyl acetate was coated with the following subbing solution:

|  | Parts |
|---|---|
| Cellulose nitrate (11% nitrogen) | 6.0 |
| Acetone | 48.0 |
| Methyl ethyl ketone | 9.6 |
| Methanol | 30.2 |
| Dioctyl phthalate | 3.0 |
| Ethanol | 3.2 |

After the coating layer had dried, the film base was coated in the same manner as in Example I and the emulsion adhered tenaciously to the copolymer of vinyl chloride and vinyl acetate film and did not crack when flexed.

*Example III*

A film base of polyvinyl acetate was coated with the following subbing solution:

|  | Parts |
|---|---|
| Cellulose nitrate (11% nitrogen) | 7.0 |
| Acetone | 50.0 |
| Methyl ethyl ketone | 10.0 |
| Methanol | 35.0 |
| Dioctyl phthalate | 4.2 |
| Ethanol | 3.5 |

After the coating layer had dried, the film base was coated in the same manner as in Example I and the emulsion adhered tenaciously to the polyvinyl acetate film support and did not crack when flexed.

The polyvinyl resin film bases produced according to the present invention were found to be entirely satisfactory and to give the customary physical requirements, such as extreme strength, flexibility, dimensional stability, good water resistance, and did not crack the gelatino silver-halide emulsion layer when flexed.

It will be understood that wherein the term "subbing" is used, that such is intended to include the operation of applying the nitrocellulose subbing layer from any one of the subbing solutions prepared in accordance with the present invention.

I claim:

1. A nitrocellulose subbing composition suitable for the subbing of a photographic film support prepared from a polymer selected from the class consisting of polyvinyl chloride, polyvinyl bromide, polyvinyl acetate, poly(vinyl chloride-vinyl acetate) and mixtures thereof which consist of a solution of:

|  | Parts by weight |
|---|---|
| Cellulose nitrate (11% nitrogen) | 5.0– 7.0 |
| Acetone | 40.0–50.0 |
| Methyl ethyl ketone | 9.0–10.0 |
| Methanol | 25.0–35.0 |
| Dioctyl phthalate | 2.5– 4.2 |
| Ethanol | 0.0– 3.5 |

2. A nitrocellulose composition suitable for the subbing of a photographic film support of polyvinyl chloride which consists of a solution of:

|  | Parts by weight |
|---|---|
| Cellulose nitrate (11% nitrogen) | 5.0 |
| Acetone | 40.0 |
| Methyl ethyl ketone | 9.0 |
| Methanol | 25.0 |
| Dioctyl phthalate | 2.5 |

3. A nitrocellulose composition suitable for the subbing of a photographic film support of poly-(vinyl chloride-vinyl acetate) which consists of a solution of:

| | Parts by weight |
|---|---|
| Cellulose nitrate (11% nitrogen) | 6.0 |
| Acetone | 48.0 |
| Methyl ethyl ketone | 9.6 |
| Methanol | 30.2 |
| Dioctyl phthalate | 3.0 |
| Ethanol | 3.2 |

4. A nitrocellulose composition suitable for the subbing of a photographic film support of polyvinyl acetate which consists of a solution of:

| | Parts by weight |
|---|---|
| Cellulose nitrate (11% nitrogen) | 7.0 |
| Acetone | 50.0 |
| Methyl ethyl ketone | 10.0 |
| Methanol | 35.0 |
| Dioctyl phthalate | 4.2 |
| Ethanol | 3.5 |

RUSSELL P. EASTON.

No references cited.